United States Patent
Singh et al.

(10) Patent No.: US 11,113,308 B1
(45) Date of Patent: Sep. 7, 2021

(54) METHOD, APPARATUS, AND COMPUTER PROGRAM PRODUCT FOR IMPROVING NETWORK DATABASE FUNCTIONALITIES

(71) Applicant: Groupon, Inc., Chicago, IL (US)

(72) Inventors: Aditya Singh, Chicago, IL (US); Ajeesh Elikkottil, Chicago, IL (US); Michael Mulvihill, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 319 days.

(21) Appl. No.: 16/034,575

(22) Filed: Jul. 13, 2018

Related U.S. Application Data

(60) Provisional application No. 62/531,936, filed on Jul. 13, 2017.

(51) Int. Cl.
  *G06F 16/30* (2019.01)
  *G06F 16/27* (2019.01)
  *G06F 16/2457* (2019.01)

(52) U.S. Cl.
  CPC ........ *G06F 16/27* (2019.01); *G06F 16/24578* (2019.01)

(58) Field of Classification Search
  CPC .......... G06F 16/27; G06F 16/24; G06F 16/00; G06F 16/24578
  See application file for complete search history.

(56) References Cited

U.S. PATENT DOCUMENTS

| | | | | |
|---|---|---|---|---|
| 2007/0156677 A1* | 7/2007 | Szabo | ................ | G06F 16/2457 |
| 2011/0078127 A1* | 3/2011 | Lin | ....................... | G06F 16/951 |
| | | | | 707/706 |
| 2011/0119273 A1* | 5/2011 | Abhyankar | ......... | G06F 16/3323 |
| | | | | 707/740 |
| 2012/0166925 A1* | 6/2012 | Boerries | ............ | G06Q 30/0251 |
| | | | | 715/205 |

* cited by examiner

*Primary Examiner* — Usmaan Saeed
*Assistant Examiner* — William P Bartlett
(74) *Attorney, Agent, or Firm* — Alston & Bird LLP

(57) ABSTRACT

Methods, apparatus and computer program products for improving network database functionalities are discussed herein, such as a computer-implemented method including receiving a network database search query associated with one or more network databases; in response to receiving the network database search query, querying the one or more network databases to identify a plurality of datasets; determining a plurality of taxonomy attributes, each of the plurality of taxonomy attributes being associated with at least one dataset of the plurality of datasets; calculating a taxonomy entropy based on the plurality of taxonomy attributes; comparing the taxonomy entropy to an entropy threshold; in response to the taxonomy entropy satisfying the entropy threshold, generating a dataset ranking based on relevance scores associated with the plurality of datasets; determining one or more taxonomy refinements based on the dataset ranking; and outputting the plurality of datasets and the one or more taxonomy refinements.

16 Claims, 8 Drawing Sheets

METHOD, APPARATUS, AND COMPUTER PROGRAM PRODUCT FOR IMPROVING NETWORK DATABASE FUNCTIONALITIES

CROSS-REFERENCE TO RELATED APPLICATIONS

This non-provisional application claims the benefit of U.S. Provisional Patent Application No. 62/531,936, filed Jul. 13, 2017, the entire contents of which are incorporated herein by reference.

BACKGROUND

Applicant has identified a number of deficiencies and problems associated with existing network databases. Through applied effort, ingenuity, and innovation, many of these identified problems have been solved by developing solutions that are included in the embodiments of the present disclosure, many examples of which are described in detail herein.

BRIEF SUMMARY

In general, embodiments of the invention provide method, apparatus, systems, computer devices, and/or the like for improving network database functionalities.

In accordance with one aspect, a computer-implemented method for improving network database functionalities is provided. In some embodiments, the computer-implemented method may include receiving, from a client device, a network database search query associated with one or more network databases; in response to receiving the network database search query, querying the one or more network databases to identify a plurality of datasets; determining a plurality of taxonomy attributes, each of the plurality of taxonomy attributes being associated with at least one dataset of the plurality of datasets; calculating a taxonomy entropy based on the plurality of taxonomy attributes; comparing the taxonomy entropy to an entropy threshold; in response to the taxonomy entropy satisfying the entropy threshold, generating a dataset ranking based on relevance scores associated with the plurality of datasets; determining one or more taxonomy refinements based on the dataset ranking; and outputting, to the client device, the plurality of datasets and the one or more taxonomy refinements.

In some embodiments, calculating the taxonomy entropy based on the plurality of taxonomy attributes includes normalizing each of the plurality of taxonomy attributes; calculating a dataset taxonomy logarithm for each normalized taxonomy attribute; determining a weight value for each of the plurality of taxonomy attributes; calculating a weighted taxonomy logarithm by multiplying each dataset taxonomy logarithm by its corresponding weight value; and calculating the taxonomy entropy by adding weighted taxonomy logarithms.

In some embodiments, the plurality of taxonomy attributes are associated with a refinement taxonomy, the refinement taxonomy being selected from the group consisting of availability, category, brand, price point, price range, location, distance, duration of time, time of day, day of week, and combinations thereof. In some embodiments, the determination of the plurality of taxonomy attributes is based on the plurality of datasets.

In some embodiments, the computer-implemented method further includes: calculating a refinement count based on the plurality of taxonomy attributes; determining whether the refinement count satisfies a refinement maximum threshold; and in response to the refinement count satisfying the refinement maximum threshold, aggregating the plurality of taxonomy attributes at a parent taxonomy level.

In some embodiments, the computer-implemented method further includes: calculating a dataset count based on the plurality of datasets; determining whether the dataset count satisfies a dataset minimum threshold; and in response to the dataset count not satisfying the dataset minimum threshold, outputting, to the client device, an electronic indication that the one or more taxonomy refinements are optionally displayed.

In some embodiments, the one or more taxonomy refinements are presented as one or more cards or one or more widgets.

In accordance with another aspect, an apparatus for improving network database functionalities is provided. The apparatus may include at least one processor and at least one non-transitory memory including program code. The at least one non-transitory memory and the program code are configured to, with the processor, cause the apparatus to at least receive, from a client device, a network database search query associated with one or more network databases; in response to receiving the network database search query, query the one or more network databases to identify a plurality of datasets; determine a plurality of taxonomy attributes, each of the plurality of taxonomy attributes being associated with at least one dataset of the plurality of datasets; calculate a taxonomy entropy based on the plurality of taxonomy attributes; compare the taxonomy entropy to an entropy threshold; in response to the taxonomy entropy satisfying the entropy threshold, generate a dataset ranking based on relevance scores associated with the plurality of datasets; determine one or more taxonomy refinements based on the dataset ranking; and output, to the client device, the plurality of datasets and the one or more taxonomy refinements.

In accordance with another aspect, the at least one non-transitory memory and program code are further configured to, with the processor, cause the apparatus to further calculate a refinement count based on the plurality of taxonomy attributes; determine whether the refinement count satisfies a refinement maximum threshold; and in response to the refinement count satisfying the refinement maximum threshold, aggregate the plurality of taxonomy attributes at a parent taxonomy level. In accordance with another aspect, the at least one non-transitory memory and program code are further configured to, with the processor, cause the apparatus to: calculate a dataset count based on the plurality of datasets; determine whether the dataset count satisfies a dataset minimum threshold; and in response to the dataset count not satisfying the dataset minimum threshold, output, to the client device, an electronic indication that the one or more taxonomy refinements are optionally displayed.

In accordance with yet another aspect, a computer program product for improving network database functionalities is provided. The computer program product may include at least one non-transitory computer-readable storage medium having computer-readable program code portions stored therein. The computer-readable program code portions include an executable portion configured to receive, from a client device, a network database search query associated with one or more network databases; in response to receiving the network database search query, query the one or more network databases to identify a plurality of datasets; determine a plurality of taxonomy attributes, each of the plurality of taxonomy attributes being associated with at least one dataset of the plurality of datasets; calculate a taxonomy entropy based on the plurality of taxonomy attributes; compare the taxonomy entropy to an entropy threshold; in response to the taxonomy entropy satisfying the entropy threshold, generate a dataset ranking based on relevance scores associated with the plurality of datasets; determine one or more taxonomy refinements based on the dataset ranking; and output, to the client device, the plurality of datasets and the one or more taxonomy refinements.

BRIEF DESCRIPTION OF THE DRAWINGS

Figure 1:
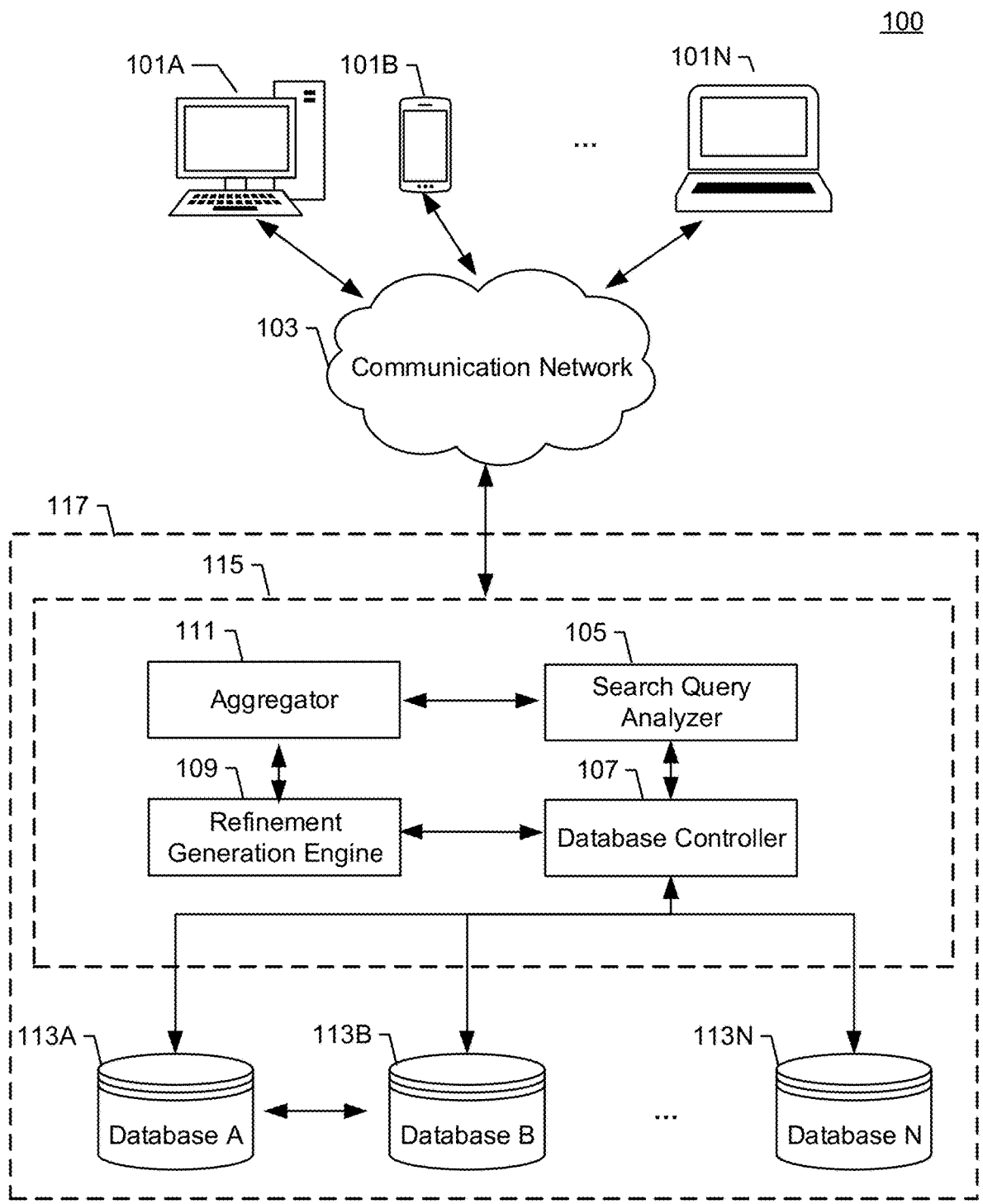
Figure 2:
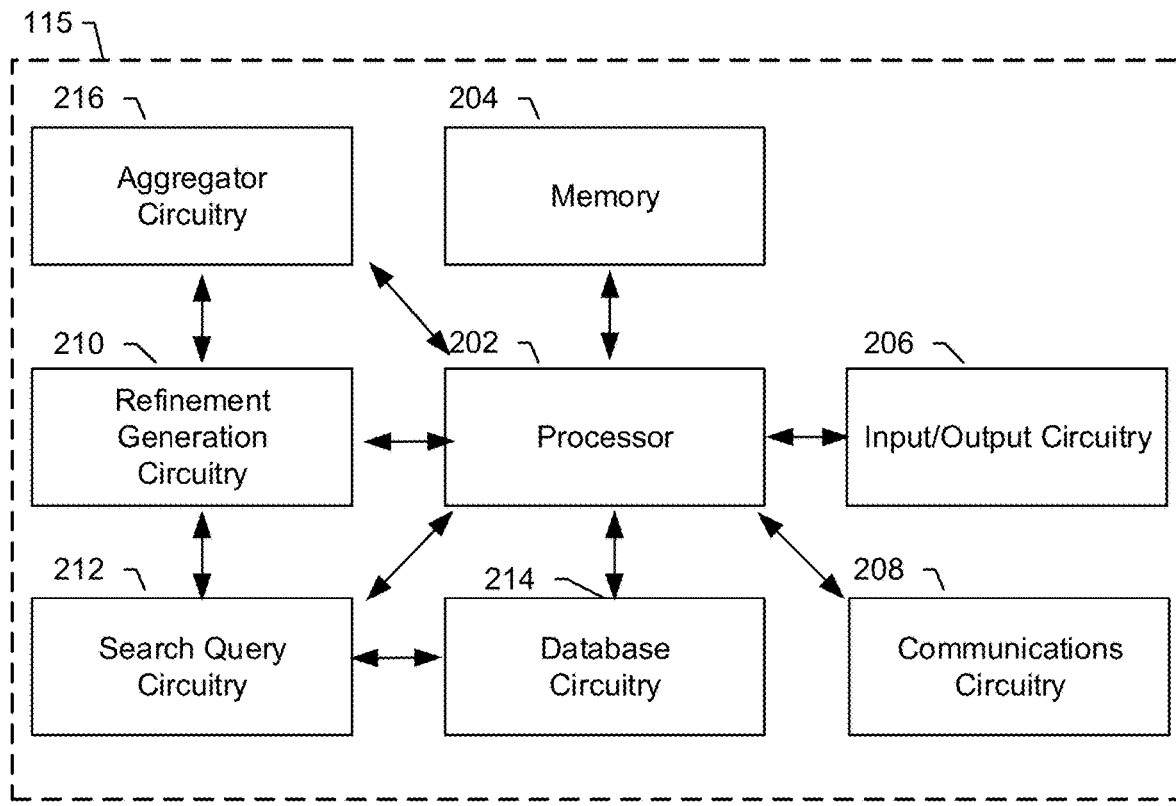
Figure 3:
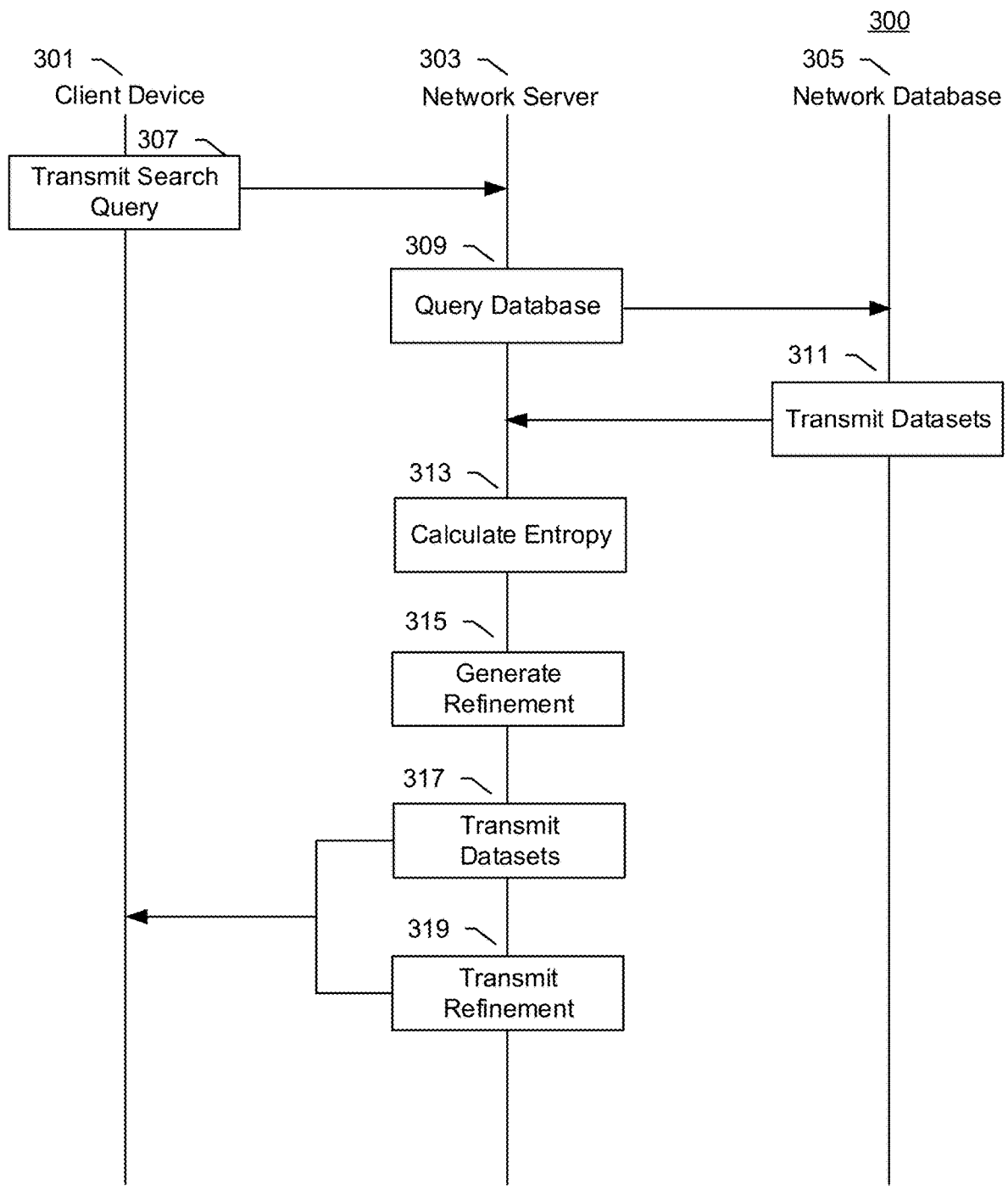
Figure 4:
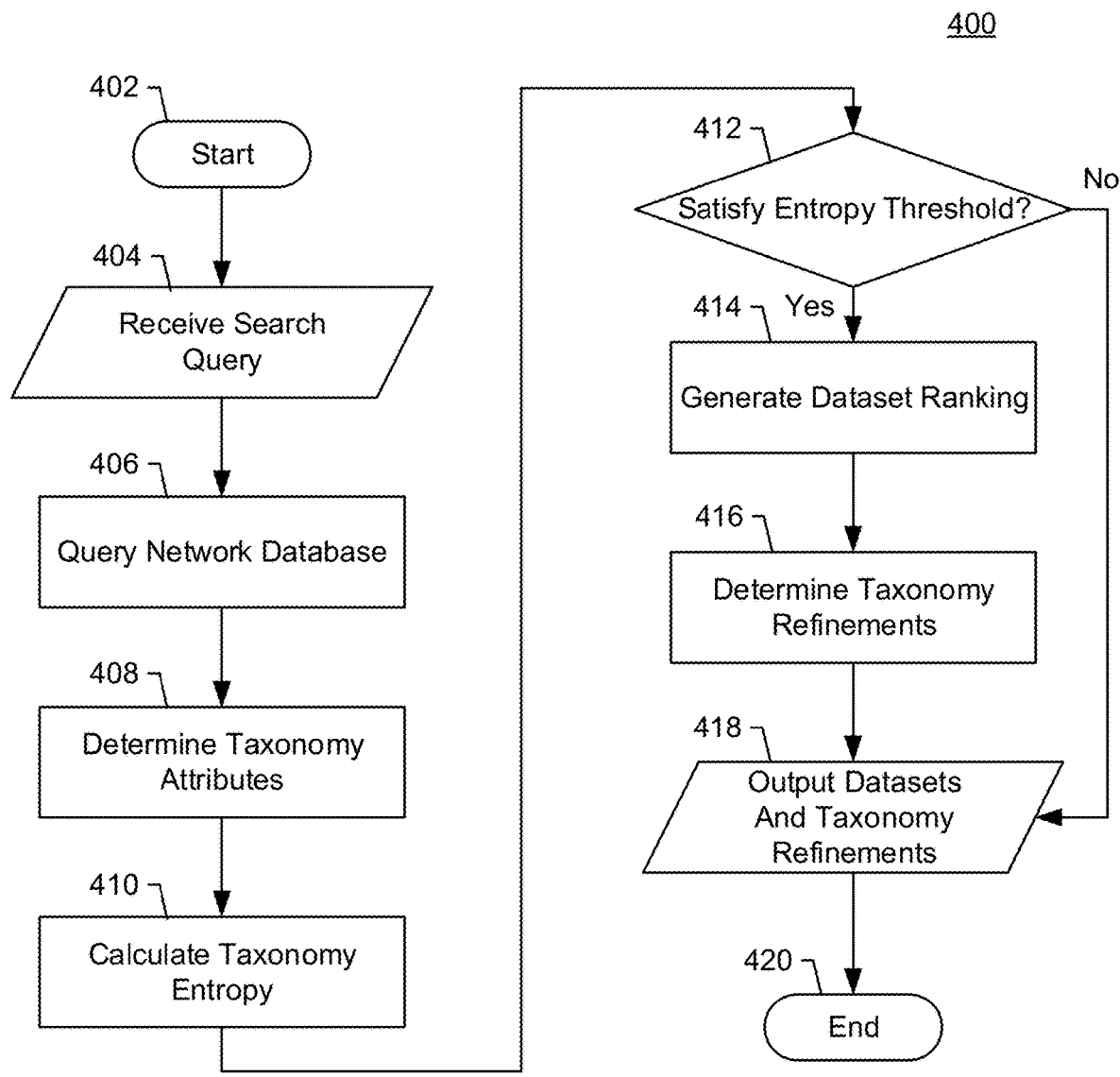
Figure 5A:
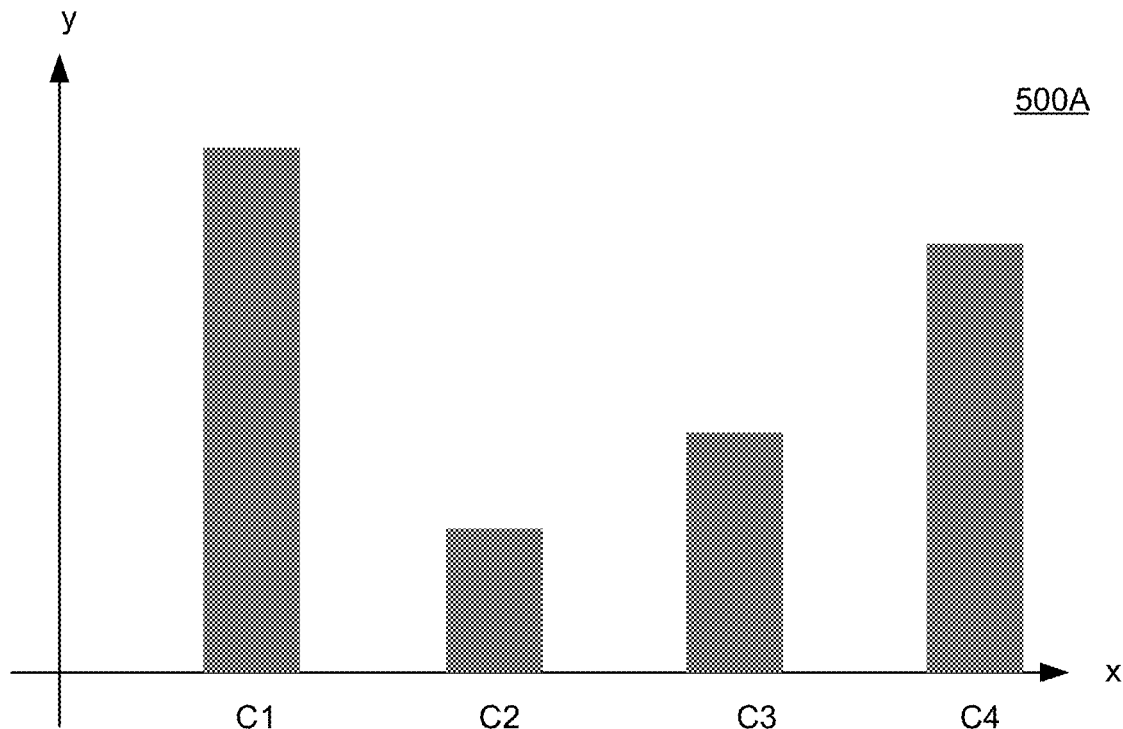
Figure 5B:
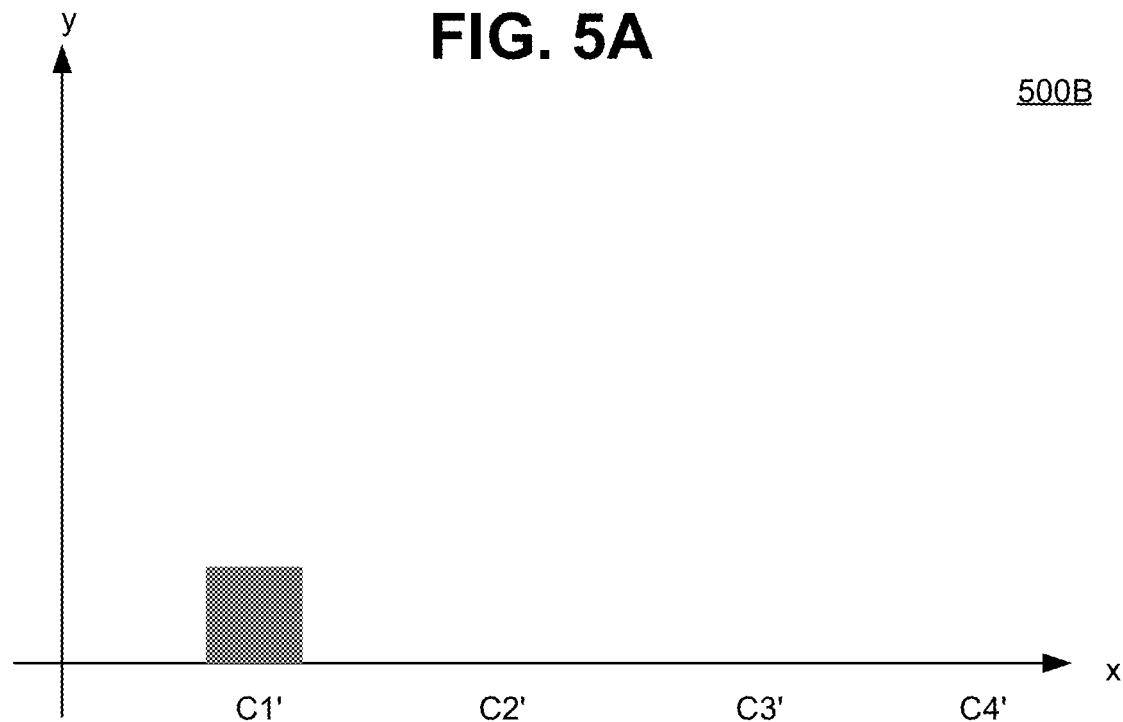
Figure 6A:
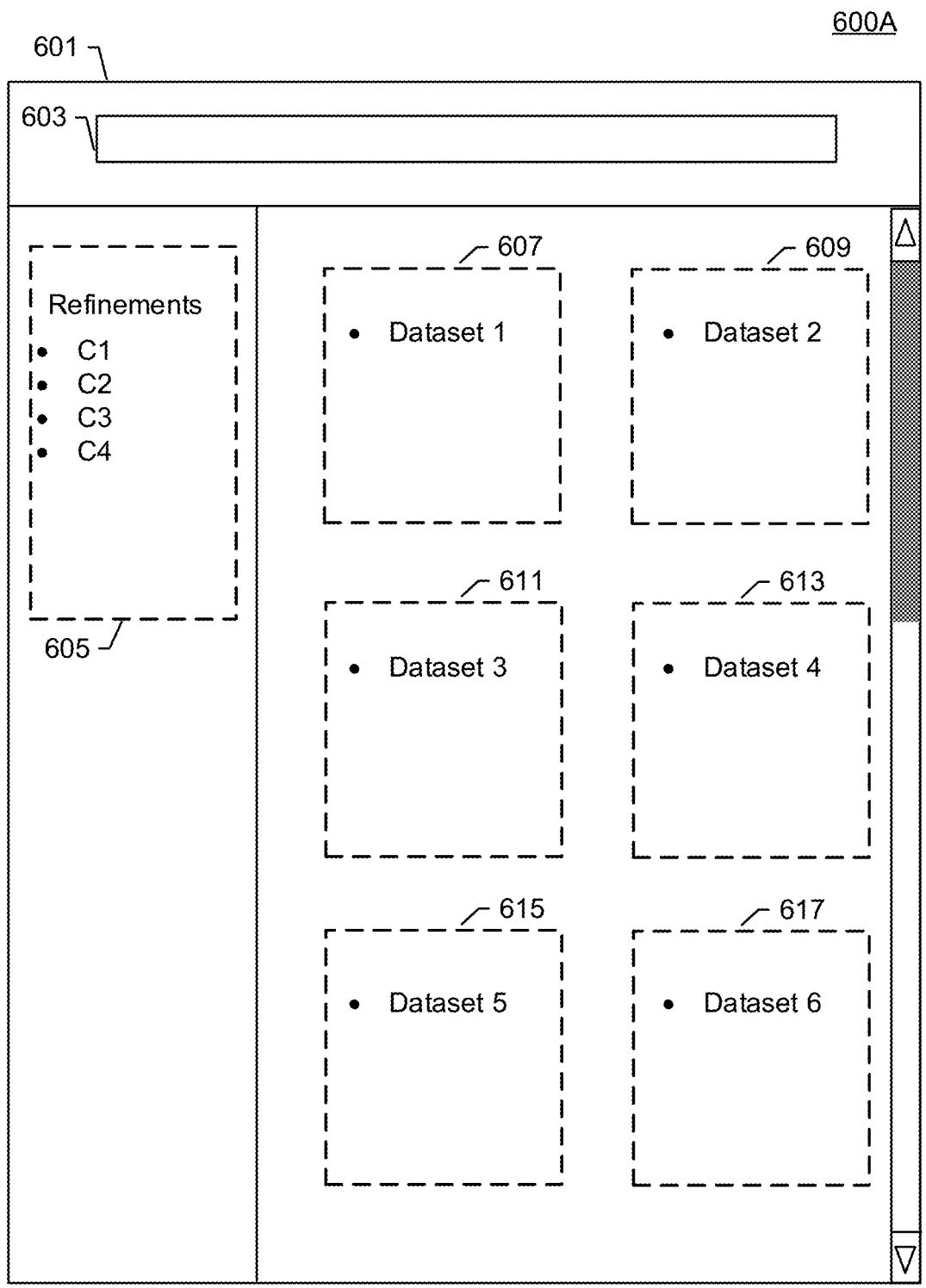
Figure 6B:
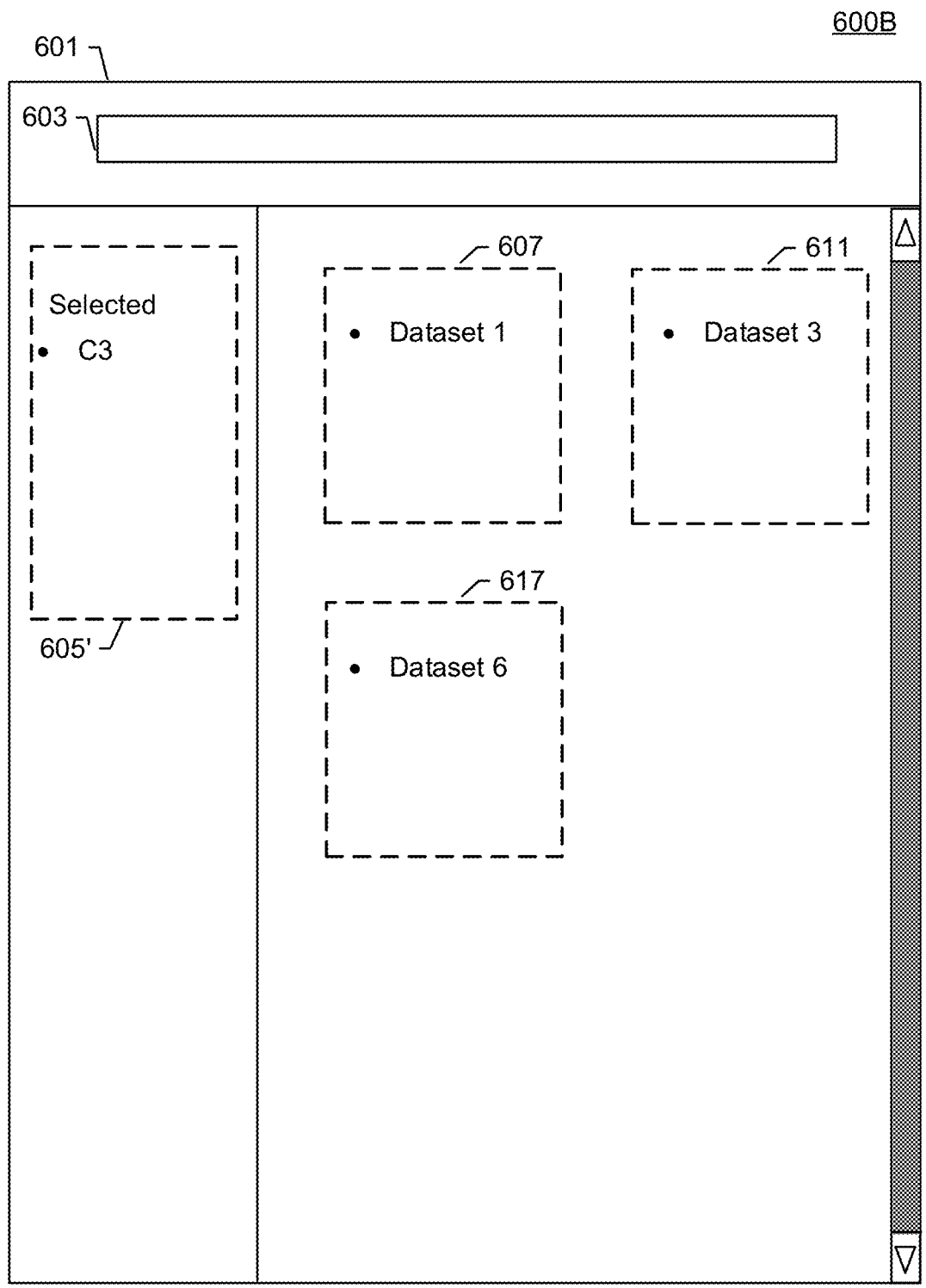
Figure 6C:
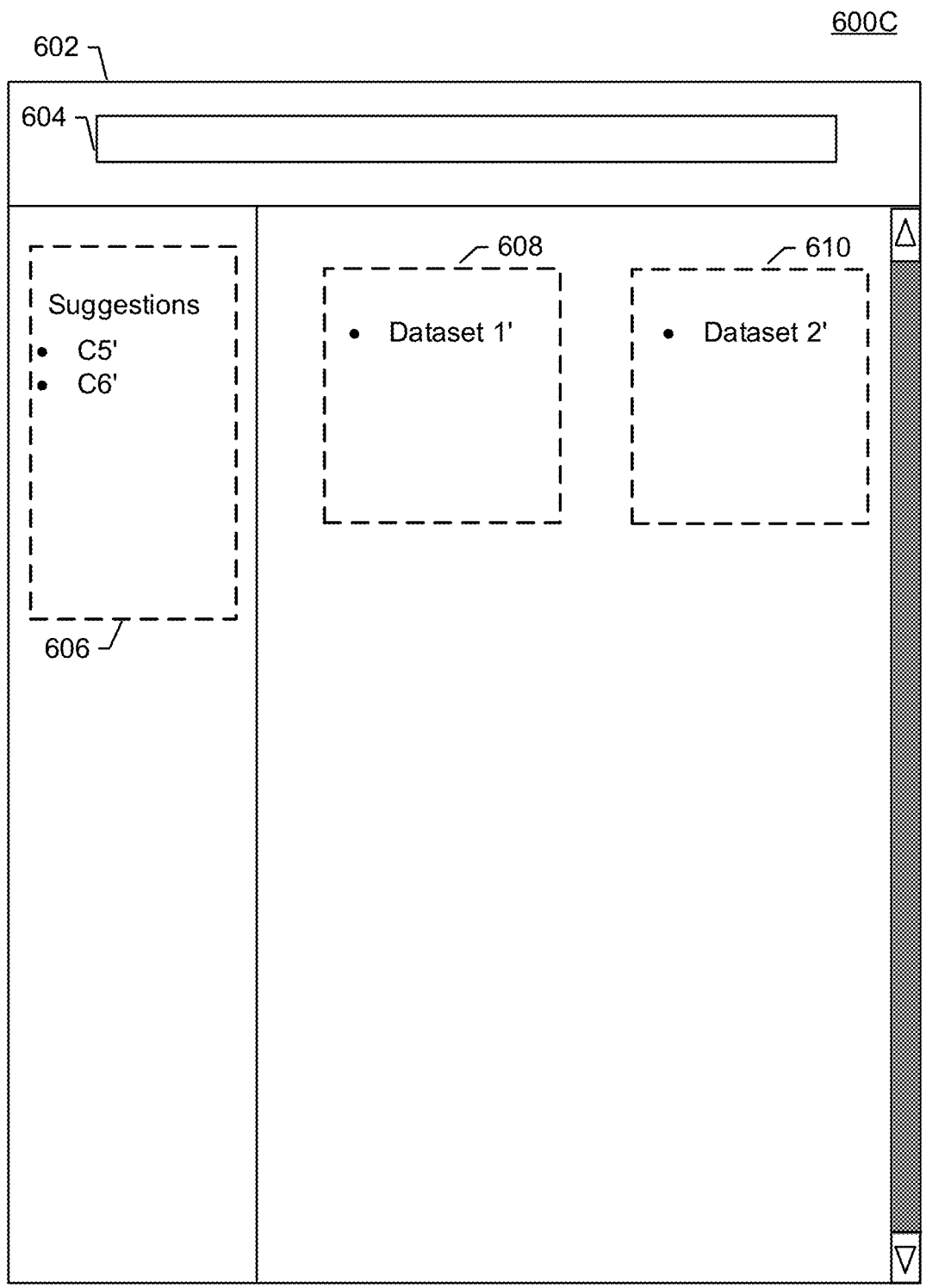

Having thus described some embodiments in general terms, reference will now be made to the accompanying drawings, which are not necessarily drawn to scale, and wherein:

FIG. 1 is an exemplary system architecture diagram of a network database system in accordance with some embodiments of the present invention;

FIG. 2 is an exemplary schematic diagram of a server according to some embodiments of the present invention;

FIG. 3 is an exemplary data flow diagram illustrating interactions between various components according to some embodiments of the present invention;

FIG. 4 is an exemplary flow chart illustrating an exemplary method in accordance with some embodiments of the present invention;

FIGS. 5A and 5B are exemplary distribution diagrams in accordance with some embodiments of the present invention; and FIGS. 6A, 6B, and 6C are exemplary interfaces in accordance with some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

The phrases "in one embodiment," "according to one embodiment," and the like generally mean that the particular feature, structure, or characteristic following the phrase may be included in at least one embodiment of the present disclosure or may be included in more than one embodiment of the present disclosure (importantly, such phrases do not necessarily refer to the same embodiment).

Overview

Various embodiments of the invention relate generally to improving network database functionalities by dynamically generating taxonomy refinements. More specifically, a network database may include a plurality of datasets, and each dataset may have one or more taxonomy attributes. A client device may transmit a search query to the network database, which requests the retrieval of datasets associated with the search query.

Many systems are plagued by limitations and inefficiencies. For example, some systems have low precisions in handling search queries (i.e. the retrieved datasets may not be relevant to the search query). For example, when a large number of datasets are queried or when the search query is relatively broad, these systems may retrieve an enormous number of irrelevant datasets. These systems are not capable of generating refinements of the search results, and may exhaust the network computing resources and decrease network efficiency in data communications.

In addition, many systems have low recalls in response to search queries (i.e. not many datasets are retrieved in response to a search query). In many implementations, these systems fail to retrieve datasets that are relevant to the search query. For example, datasets may have a strong temporal nature (i.e. these datasets may be frequently added, deleted, or revised—thousands of datasets may be updated within a short amount time in a large-scale system). However, some systems may take the databases offline in order to refine the search results, causing delays in search query processing. Such systems prevent users from adding, deleting, or revising the datasets (which could have a strong temporal nature) when the network database is offline, despite the possibility that the new or revised datasets may be relevant to the search query. Therefore, these systems fail to provide all relevant, up-to-date datasets in response to search queries.

In contrast, various embodiments of the invention provide a network database platform (e.g. a network database platform offered by Groupon®) that improves precision and recall. For example, a network database platform in accordance with embodiments of the invention may generate real-time filters to narrow down database search results. This enhances the retrievability of datasets stored in network databases, which improves network database functionalities and limits network resource waste.

The inventors have identified that system resources for offline refinements can be easily exhausted, and failure to keep data up-to-date may compromise data integrity of network databases. The inventors have determined that the ability to dynamically generate taxonomy refinements would reduce the system resources and time for filtering the search results, which improves the precision and recall of the network database systems.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearable devices, personal computers, enterprise computers, and the like.

The term "user input" refers to data that is provided to a client device by a user, either directly or indirectly, via one or more input devices. The input device may be a number pad, a keyboard, a cursor control device (such as a mouse), a joystick, touch screen display, remote control, or any other device operative to interact with the client device.

The term "network database" refers to a collection of data in a computer network that is organized so that its contents can easily be accessed, managed, and updated. Network databases may contain aggregations of datasets, such as product inventories, product catalogs, sales transactions, and customer profiles. Network databases may be classified according to its dataset type, such as bibliographic, full text, numeric, and images. Network databases may also be classified based on its organizational structure, such as relational database, distributed database, cloud database, Not Only SQL (NoSQL) database, object-oriented database, and graph database.

The term "database functionality" refers to the ability of a network database to handle its related functions, such as answering a "database query." A "database query" is a request associated with a database. For example, a database search query (or a data retrieval query) is a request to obtain certain data from a database. Usually, retrieved data is presented in a standard format and displayed on a monitor. A databased query may be coded in a query language, which enables interactive retrieval of information from the database without having to write a complex program.

The term "dataset" refers to a collection of related, discrete items of data that may be accessed individually, or in combination or managed as a whole entity. Usually, a dataset is organized into some type of data structure. In a database, for example, a dataset may indicate a promotion and contain a collection of business data. As described in more detail hereinafter, a dataset may have one or more taxonomy attributes.

The term "taxonomy" refers to the classification and organization of datasets that result in a framework for data analysis and information retrieval. For example, taxonomy may separate datasets into groups and subgroups, which reflects the totality of similarities and differences of these groups and subgroups. A "taxonomy attribute" is an attribute, associated with a particular taxonomy, that is assigned to one or more datasets. For example, if the dataset contains data related to a transaction, a taxonomy attribute could be the category in which the transaction is associated with. A "taxonomy refinement" is a taxonomy filter that selects a subset of datasets retrieved in response to a database search query based on a selected taxonomy (e.g. a "refinement taxonomy"), details of which are described hereinafter. A taxonomy refinement may eliminate unnecessary and irrelevant datasets from the search results, and may further identify other datasets that may be relevant to the database search query.

The term "entropy" refers to a measure of the order deterioration within a system or group (for example, taxonomy attributes associated with a plurality of datasets). The entropy of a distribution may measure the uncertainties associated with each item in the distribution. An "entropy threshold" is a threshold value for the entropy of a system. Nominally, the entropy threshold T is 1.584962, which represents the entropy of a group of datasets having three taxonomy attributes, and with five datasets in each taxonomy attribute. In various embodiments of the invention, the value of the entropy threshold may be defined by the system.

The term "relevance score" refers to a score that indicates the relevance of a dataset retrieved based on a database search query. For example, a relevance score may be calculated according to the methods disclosed in U.S. patent application Ser. No. 14/824,912, entitled "Universal Relevance Service Framework," filed Aug. 12, 2015, which is incorporated herein in its entirety.

The term "promotion" may include, but is not limited to, any type of offered, presented or otherwise indicated reward, discount, coupon, credit, deal, incentive, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

The term "impression" may include an electronic communication, a display, or other electronic indication, such as electronic mail, text message, application alert, mobile application notification, and/or other type of electronic interface or distribution channel, of one or more datasets. For example, if the dataset is a promotion, then an impression of the dataset may be an electronic display of that promotion, indicating information such as the accepted value, merchant, and expiration date associated with the promotion.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system within which embodiments of the present invention may operate. Users may access a database platform 117 via a communication network 103 (e.g., the Internet, Wi-Fi, LAN, WAN, or the like) using client devices 101A-101N. The database platform 117 may comprise a server 115 in communication with one or more network databases 113A-113N. The server 115 may comprise a search query analyzer 105, a database controller 107, a refinement generation engine 109, and an aggregator 111 in communication with one or more network databases 113A-113N.

The server 115 may be embodied as a computer or computers as known in the art. The server 115 may provide for receiving of electronic data from various sources, including but not limited to the client devices 101A-101N. For example, the server 115 may be operable to receive and process network database search queries provided by the client devices 101A-101N. The server 115 may also facilitate generating and providing various taxonomy refinements.

The client devices 101A-101N may be any computing device as defined above. Electronic data received by the server 115 from the client devices 101A-101N may be provided in various forms and via various methods.

In some preferred and non-limiting embodiments, one or more of the client devices 101A-101N is a mobile device, such as a smart phone or tablet. The one or more client devices may execute an "app" to interact with the server 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

In some preferred and non-limiting embodiments, the client devices 101A-101N may interact with the server 115 via a web browser. The client devices 101A-101N may also include various hardware or firmware designed to interact with the server 115.

In some preferred and non-limiting embodiments, the network databases 113A-113N may be embodied as a data storage device such as a network attached storage (NAS) device or devices, or as a separate database server or servers. The network databases 113A-113N include information accessed and stored by the database controller 107. For example, the network databases 113A-113N may include, without limitation, user profiles, location information and/or the like.

An example of electronic information exchange among one or more client devices 101A-101N and the database platform 117 is described below.

One or more client devices, such as the one or more client devices 101A-101N, are configured to generate a network database search query associated with the network databases 113A-113N. The network database search query may describe one or more commands from the one or more client devices 101A-101N to the database platform 117 to identify one or more datasets from the network databases 113A-113N. The network database search query may be transmitted to the database platform 117 via the communication network 103.

The database platform 117 may provide the network database search query to the server 115. Upon receiving the network database search query, the server 115 may utilize the search query analyzer 105 to parse the search terms. The parsed search terms are then communicated to the database controller 107 to identify one or more of the network databases 113A-113N that are associated with the network database search query. Upon identifying the associated network database(s), the database controller 107 then retrieves one or more datasets from the associated network database(s) that are associated with the network database search query. Each dataset may include a relevance score and one or more taxonomy attributes.

The server 115 may then utilize the refinement generation engine 109, in association with the retrieved datasets, to determine whether one or more taxonomy refinements is necessary. As described in more details hereinafter, to make the determination, the refinement generation engine 109 may identify several taxonomy attributes associated with the retrieved datasets and calculate a taxonomy entropy. The refinement generation engine 109 may also compare the taxonomy entropy with a predetermined threshold and generate taxonomy refinements when the taxonomy entropy satisfies the predetermined threshold. To generate the taxonomy refinements, the refinement generation engine 109 may rank the retrieved datasets based on relevance scores.

After the taxonomy refinements are generated by the refinement generation engine 109, the server 115 may utilize the aggregator 111 to aggregate taxonomy refinements. For example, the search refinements may be aggregated based on its corresponding taxonomy (e.g. category, distance, etc.). Further, the aggregator 111 may group and sort various taxonomy refinements generated by the refinement generation engine 109.

Upon finishing the aggregation, the server 115 may transmit the taxonomy refinements and the retrieved datasets via the communication network 103 to one or more client devices 101A-101N. The one or more client devices 101A-101N are configured to display taxonomy refinements and impressions of the retrieved datasets.

Example Apparatus for Implementing Embodiments of the Present Invention

The server 115 may be embodied by one or more computing systems, such as apparatus 200 shown in FIG. 2. The apparatus 200 may include processor 202, memory 204, input/output circuitry 206, communications circuitry 208, refinement generation circuitry 210, search query circuitry 212, database circuitry 214, and aggregator circuitry 216. The apparatus 200 may be configured to execute the operations described above with respect to FIG. 1 and below with respect to FIGS. 3 and 4. Although these components 202-214 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Refinement generation circuitry 210 includes hardware configured to generate taxonomy refinements based on a network database search query and/or parsed search terms. The refinement generation circuitry 210 may utilize processing circuitry, such as the processor 202, to perform these actions. The refinement generation circuitry 210 may receive data from the search query circuitry 212 and the database circuitry 214, and send data to the communications circuitry 208. In some preferred and non-limiting embodiments, the data sent may be associated with the one or more taxonomy refinements.

In some embodiments, the refinement generation circuitry 210 may include a separate processor, specially configured Field Programmable Gate Array (FPGA), or Application Specific Integrated Circuit (ASIC). In some implementations, the search query circuitry 212 and the database circuitry 214, described below, may be sub-circuitries belonging to refinement generation circuitry 210. The refinement generation circuitry 210 may be implemented using hardware components of the apparatus configured by either hardware or software for implementing the functions described herein.

The search query circuitry 212 includes hardware configured to manage network database search queries associated with one or more network databases. The search query circuitry 212 may utilize processing circuitry, such as the processor 202, to perform these actions. However, it should also be appreciated that, in some embodiments, the search query circuitry 212 may include a separate processor, specially configured Field Programmable Gate Array (FPGA), or Application Specific Integrated Circuit (ASIC) for performing the functions described herein. The search query circuitry 212 may be implemented using hardware components of the apparatus configured by either hardware or software for implementing these planned functions.

The database circuitry 214 includes hardware configured to manage one or more network databases. The database circuitry 214 may utilize processing circuitry, such as the processor 202, to perform these actions. However, it should also be appreciated that, in some embodiments, the database circuitry 214 may include a separate processor, specially configured Field Programmable Gate Array (FPGA), or Application Specific Integrated Circuit (ASIC) for performing the functions described herein. The database circuitry 214 may be implemented using hardware components of the apparatus configured by either hardware or software for implementing these planned functions.

The aggregator circuitry 216 includes hardware configured to aggregate taxonomy refinements generated by the refinement generation circuitry 210. The aggregator circuitry 216 may utilize processing circuitry, such as the processor 202, to perform these actions. However, it should also be appreciated that, in some embodiments, the aggregator circuitry 216 may include a separate processor, specially configured Field Programmable Gate Array (FPGA), or Application Specific Integrated Circuit (ASIC) for performing the functions described herein. The aggregator circuitry 216 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionalities discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flow for Generating Taxonomy Refinements

FIG. 3 depicts an example data flow 300, illustrating interactions between one or more client devices 301, one or more network servers 303, and one or more network databases 305. The one or more network servers 303 may be implemented in the same or a similar fashion as the server 115 described above with respect to FIGS. 1 and 2. The one or more client devices 301 may be implemented in the same or a similar fashion as the client devise 101A-101N as described above with respect to FIG. 1. The one or more network databases 305 may be implemented in the same or a similar fashion as the network databases 113A-113N as described above with respect to FIG. 1.

The data flow 300 illustrates how electronic information may be passed among various systems and elements. At block 307, the one or more client devices 301 may transmit a network database search query to the one or more network servers 303. The network database search query may be associated with one or more network databases 305. For example, a network database may store datasets related to promotions, and a client device may transmit a search query "golf" to the network server to request retrieval of promotions related to "golf."

At block 309, upon receiving the network database search query, the one or more network servers 303 may query the one or more network databases 305. In some preferred and non-limiting embodiments, the one or more network servers 303 may parse the network database search query. For example, the one or more network servers 303 may divide words and phrases within network database search query into different parts. The one or more network servers 303 then identify the meaning of and relationship between each part, and further query the one or more network databases 305. In some preferred and non-limiting embodiments, the one or more client devices 301 may conduct parsing of the network database search query and transmit parsed network database search query directly to the one or more network servers 303.

In response to the one or more network servers 303 querying the one or more network databases 305, the one or more network databases 305 may transmit datasets at block 311. The datasets transmitted to the one or more network servers 303 are retrieved based on the network database search query. Each of the datasets may include a relevance score and one or more taxonomy attributes. As described in more details hereinafter, the one or more network servers 303 may determine a taxonomy attribute for the purpose of generating taxonomy refinements. Continuing from the previous example, the network server may query the network database for datasets related to "golf," and may receive datasets related to golf promotions from the network database. Each dataset may include a relevance score, which indicates the relevance of the corresponding promotion with respect to "golf." Each dataset may also include one or more taxonomy attributes. For example, one dataset may be associated with the taxonomy attribute "local," which indicates that the associated promotion is a local promotion.

In some embodiments, the network database may generate indexes based on taxonomy attributes, and the network server may query the network database using indexes, depending on the specificity level of the network database search query. The network database may then present datasets from various indexes as retrieved datasets. An index is a data structure that provides a schema of a collection of data. Here, the network database may group relevant datasets based on a taxonomy in generating an index. Continuing from the previous example, the network database may generate an index for all datasets having the "local" taxonomy attribute (i.e. a "local index"). Similarly, the network database may generate a "goods index" (for goods promotions) and a "gateway index" (for getaway promotions). When the network database search query is "golf," the network database may retrieve datasets based on the "local index," "goods index," and "getaway index."

At block 313, after receiving the one or more datasets from the one or more network databases 305 and determining a taxonomy attribute for the purpose of generating taxonomy refinements, the one or more network servers 303 calculate an entropy of the received datasets, details of which are described hereinafter. The one or more network servers 303 then compare the entropy with a predetermined threshold. In some preferred and non-limiting embodiments, the predetermined threshold may be based on a user input value. In some preferred and non-limiting embodiments, the predetermined threshold may be generated by the one or more network servers 303 based on the one or more network databases 305. For example, a specific threshold may be generated for network database storing datasets having a particular taxonomy attribute.

Upon determining that the taxonomy entropy satisfies the predetermined threshold, the one or more network servers 303 may generate one or more taxonomy refinements at block 315. The one or more taxonomy refinements suggest further refinements of datasets based on one or more taxonomy attributes associated with the datasets. At blocks 317 and 319, the one or more network servers 303 transmit the datasets and one or more taxonomy refinements to the one or more client devices 301.

Example Process for Generating Taxonomy Refinements

FIG. 4 illustrates a flow diagram depicting an example of a process 400 for generating taxonomy refinements. The process 400 may be fully-automated and implement the information theoretic notion of entropy calculations in a manner that removes the "difficulties" of user experience (for example, the challenge of low precision as described above) associated with navigating a set of retrieved datasets with multiple taxonomy attributes. In other words, through implementing algorithms associated with entropy calculations, the process 400 blends search precisions along with the ability to refine search results.

The process 400 begins at step 402. At step 404, the process 400 receives a network database search query. The process 400 then queries one or more network databases associated with the network database search query, and retrieves datasets from the one or more network databases based on the network database search query at step 406. Each of the datasets includes at least one taxonomy attribute and a relevance score. For example, the network database search query may be "restaurant," and the network databases store electronic information regarding datasets related to restaurants. In this example, the process 400 queries the network databases and identifies datasets associated with restaurants. Each dataset has a relevance score and one or more taxonomy attributes. The relevance score may indicate how relevant the dataset is as to the network database search query. The one or more taxonomy attributes may include price point, price range, category, operation hours, distance, etc.

At step 408, the process 400 selects one or more taxonomy attributes for the purpose of generating refinements. In some preferred and non-limiting embodiments, the determination may be based on the datasets identified from the network database search query. Continuing from the previous example, the taxonomy may be "category," and the taxonomy attributes in the retrieved datasets include "Italian restaurant," "Indian restaurant," and "Japanese restaurant." In some preferred and non-limiting embodiments, the user may set a preference as to which taxonomy to use to generate taxonomy refinements. In some embodiments, the selected one or more taxonomy attributes (i.e. refinement taxonomy) may include, for example, availability of the promotion (i.e. when is the promotion available for redemption), a category of the promotion, a brand associated with the promotion, a price point of the promotion, a price range that the promotion fits in, a location for redeeming the promotion, a travel distance between a user location and the location for redeeming the promotion, and duration of time, time of day and day of week associated with the promotion redemption.

The process 400 may also generate a taxonomy tree based on the taxonomy attributes of the datasets that are retrieved. The leaves of the taxonomy tree may include taxonomy attributes of each dataset. Continuing from the previous example, the leaves of the taxonomy tree for "category" may include "Italian restaurant," "Indian restaurant," and "Japanese restaurant." Each dataset having a particular taxonomy attribute is further connected to the respective leaf on the taxonomy tree as a node.

In some preferred and non-limiting embodiments, the process 400 may also determine whether taxonomy refinements are necessary based on the retrieved datasets themselves. For example, if all of the datasets retrieved based on a network database search request have the taxonomy attribute of "Italian restaurant," then further refinement of the datasets based on the "category" is not necessary. On the other hand, if the datasets retrieved have various "category" attributes, then further refinement based on "category" may be necessary.

In some preferred and non-limiting embodiments, a minimum threshold number of items, S, is used to determine whether a refinement is necessary. For example, if S is equal to 5, and the number of datasets retrieved based on a network database search query is 3, then refinement may not be necessary. In this regard, the network server may transmit an electronic indication (such as an electronic message) to the client device, indicating that the refinements are optionally displayed (i.e. the display of the refinements on a user interface is optional). In some preferred and non-limiting embodiments, the minimum number of items S may be determined based on the taxonomy. In some preferred and non-limiting embodiments, a user may set the value of S.

In some preferred and non-limiting embodiments, when the process 400 determines that the number of datasets is less than S, the process 400 may "roll-up" the level of taxonomy attributes associated with the datasets. In other words, when the number of datasets in a child taxonomy attribute does not satisfy S, the process 400 may calculate the number of datasets associated with the parent taxonomy attribute. For example, the taxonomy attribute "Charlotte" may be a child taxonomy attribute of the parent taxonomy attribute "North Carolina." If the number of datasets having the taxonomy attribute of "Charlotte" does not satisfy the minimum number of items S, then the process 400 may use "North Carolina" as the taxonomy attribute in calculating the entropy in step 410, which will be discussed in more details hereinafter.

In some preferred and non-limiting embodiments, the roll-up may be based on a route that achieves the minimum entropy reduction. For example, the Table 1 below illustrates various taxonomy attributes of a particular taxonomy, and their corresponding entropy calculations:

TABLE 1

| Taxonomy Attribute | Dataset Count | Entropy |
| --- | --- | --- |
| A | 2 | 0.096649091546 |
| B | 3 | 0.128755032995 |
| C | 10 | 0.268653736072 |
| D | 15 | 0.321887582487 |
| E | 20 | 0.352468223995 |
| F | 25 | 0.366204096223 |

In some preferred and non-limiting embodiments, the process 400 may merge taxonomy attributes having the least numbers of datasets. Continuing from the example above, the process 400 may merger taxonomy attributes A and B, resulting the taxonomy distribution and relevant entropies as illustrated in Table 2 below:

TABLE 2

| Taxonomy Attribute | Dataset Count | Entropy |
|---|---|---|
| A + B | 5 | 0.180536680073 |
| C | 10 | 0.268653736072 |
| D | 15 | 0.321887582487 |
| E | 20 | 0.352468223995 |
| F | 25 | 0.366204096223 |

In some preferred and non-limiting embodiments, the process 400 may merge attributes having the most numbers of datasets. Continuing from the previous example, the process 400 may merge taxonomy attributes E and F, resulting the taxonomy distribution and relevant entropies as illustrated in Table 3:

TABLE 3

| Taxonomy Attribute | Dataset Count | Entropy |
|---|---|---|
| A | 2 | 0.096649091546 |
| B | 3 | 0.128755032995 |
| C | 10 | 0.268653736072 |
| D | 15 | 0.321887582487 |
| E + F | 45 | 0.30649537426 |

At step 410, the process 400 calculates a taxonomy entropy based on the datasets associated with the taxonomy attributes. The calculation is based on the information theoretic concept of entropy, which allows the process 400 to identify conditions under which the refinements need to be generated. The entropy H(x) for a discrete random variable x is a measure of its uncertainty. In some preferred and non-limiting embodiments, it can be calculated as:

$$H(x) = \Sigma_i P(x_1) I(x_i)$$

Here, $x_i$ is the i-th value that x can assume, $P(x_i)$ is the probability of x assuming that value, and $I(x_i)$ is the standard indicator function. To put it differently, $$H(x) = -\Sigma_i P(x_i) \log_b P(x_i)$$

In some preferred and non-limiting embodiments, the base b for the logarithm is chosen to be b=2. In some preferred and non-limiting embodiments, $P(x_1)$ can be determined as follows:

$$P(x_i) = \frac{w_i}{\sum_i w_i}$$

Here, the weight value $w_i$ itself can be defined in multiple ways. In some preferred and non-limiting embodiments, $w_i$ can be the count of how many times $x_i$ occurs in the distribution.

In other words, to calculate the taxonomy entropy, the process 400 first normalizes each taxonomy attribute $P(x_i)$ based on the probability that each taxonomy attribute would occur among the taxonomy attributes. The process 400 then calculates a dataset taxonomy logarithm $\log_b P(x_i)$ for each normalized taxonomy attribute, and determines a weight value for each taxonomy attribute. The process 400 then calculates weighted taxonomy logarithms by multiplying each dataset taxonomy logarithm $\log_b P(x_i)$ with its corresponding weight value. Subsequently, the process 400 calculates the taxonomy entropy by adding the weighted taxonomy logarithms (i.e. the entropy of the datasets from their distribution over the taxonomy attributes).

Continuing from the previous example, assuming there are ten (10) datasets having the taxonomy attribute of "Italian restaurants," eight (8) datasets having the taxonomy attribute of "Indian restaurant," and seven (7) datasets having the taxonomy attribute of "Japanese restaurants," the probabilities of each taxonomy attribute can be calculated as follows:

$$P(x_1) = \frac{10}{25}; P(x_2) = \frac{8}{25}; P(x_3) = \frac{7}{25}$$

Here, P ($x_1$) is the probability of "Italian restaurants," P ($x_2$) is the probability of "Indian restaurants," and P($x_3$) is the probability of "Japanese restaurants."

Accordingly, in this example, the entropy of category can be calculated as follows:

$$H(x) = -\sum_i P(x_i) \log_b P(x_i) = -\left[\frac{10}{25}\log\frac{10}{25} + \frac{8}{25}\log\frac{8}{25} + \frac{7}{25}\log\frac{7}{25}\right] = 1.572$$

At step 412, the process 400 determines whether the taxonomy entropy satisfies an entropy threshold. The entropy threshold is used as a qualifier to identify cases in which the entropy is enough to justify the generation of taxonomy refinements. In other words, if the entropy does satisfy the entropy threshold, no taxonomy refinement will be necessary.

At step 414, upon determining that the entropy threshold is satisfied, process 400 generates a ranking of the retrieved datasets based on their respective relevance score. Continuing from the previous example, if the combined relevance score of datasets associated with "Italian restaurants" is 32, while the combined relevance score of datasets associated with "Indian restaurant" is 12, then the datasets associated with "Italian restaurants" are ranked higher than datasets associated with "Indian restaurants."

Based on the dataset ranking, the process 400 determines taxonomy refinements at step 416. In some preferred and non-limiting embodiments, the process 400 may compares the number of refinements R with a minimum number of refinement $R_{min}$ and a maximum threshold number of refinement $R_{max}$. If $R<R_{min}$, then the process 400 will determine that no refinement is generated. If $R>R_{max}$, then the process 400 will only generate the top ranked refinements. For example, if R=4 and $R_{max}$=3, then only the top three (3) ranked taxonomy attributes will be indicated in the taxonomy refinements.

At step 418, the process 400 outputs the retrieved datasets and the determined taxonomy refinements. If the process 400 determines that taxonomy refinements are not necessary at step 414, then the process 400 will only return the retrieved datasets. Similarly, if the process 400 determines that the taxonomy entropy calculated at step 410 does not satisfy the entropy threshold at step 412, then no taxonomy refinement is generated, and only the retrieved datasets are outputted in step 418.

In some preferred and non-limiting embodiments, the output is in the form of a taxonomy tree. The taxonomy refinements are leaves of the taxonomy tree, and the datasets are linked to its respective taxonomy refinements.

For example, the following program codes describe the structure of a taxonomy tree:

```
[
    {
        "computedFieldType": "NONE",
        "topCategory": {
            "seoName": "local",
            "seoNameMap": {
                "fr_CA": "local",
                "en_CA": "local",
                "en": "local"
            },
            "uuid": "c09790ba-a6b9-40fc-ad81-4cdf25260b5e"
        },
        "category": {
            "seoName": "food-and-drink",
            "seoNameMap": {
                "fr_CA": "alimentation-et-boisson",
                "en_CA": "food-and-drink",
                "en": "food-and-drink"
            },
            "uuid": "f052f491-36c2-406f-a196-be2c59d281f4"
        },
        "subCat": {
            "seoName": "restaurants",
            "seoNameMap": {
                "fr_CA": "restaurant",
                "en_CA": "restaurants",
                "en": "restaurants"
            },
            "uuid": "5b99fc65-2d2f-48d8-ac26-c4b629c0a439"
        },
        "subCat2": {
            "seoName": "pizza",
            "seoNameMap": {
                "fr_CA": "pizza",
                "en_CA": "pizza",
                "en": "pizza"
            },
            "uuid": "de167e83-e730-43c1-85d6-60a323825e9d"
        }
    }
    ,{
        "computedFieldType": "NONE",
        "topCategory": {
            "seoName": "local",
            "seoNameMap": {
                "fr_CA": "local",
                "en_CA": "local",
                "en": "local"
            },
            "uuid": "c09790ba-a6b9-40fc-ad81-4cdf25260b5e"
        },
        "category": {
            "seoName": "food-and-drink",
            "seoNameMap": {
                "fr_CA": "alimentation-et-boisson",
                "en_CA": "food-and-drink",
                "en": "food-and-drink"
            },
            "uuid": "f052f491-36c2-406f-a196-be2c59d281f4"
        },
        "subCat": {
            "seoName": "restaurants",
            "seoNameMap": {
                "fr_CA": "restaurant",
                "en_CA": "restaurants",
                "en": "restaurants"
            },
            "uuid": "5b99fc65-2d2f-48d8-ac26-c4b629c0a439"
        },
        "subCat2": {
            "seoName": "italian-restaurants",
            "seoNameMap": {
                "fr_CA": "restaurant-italien",
                "en_CA": "italian-restaurants",
                "en": "italian-restaurants"
            },
            "uuid": "bcc67488-4bce-4de3-80ea-5e4a78cd1f90"
        }
    }
]
```

The above program codes illustrate parent-child relationships of taxonomy attributes in an example taxonomy tree. For example, the taxonomy attribute "restaurants" is a parent of the taxonomy attribute "pizza," and a child of the taxonomy attribute "food-and-drink."

The process 400 ends in step 420.

Example Implementation for Generating Taxonomy Refinements

FIGS. 5A and 5B illustrate example distributions of datasets across taxonomy attributes according to some embodiments of the present invention. FIGS. 6A, 6B, and 6C illustrate example interfaces according to some embodiments of the present invention.

Referring now to FIG. 5A, an example dataset distribution 500A of datasets retrieved based on a network database search query is shown. The datasets can be retrieved based on a set of dataset retrieval procedures, such as the procedures described in connection with FIGS. 3 and 4. The datasets can be retrieved from network databases using a network server, such as the various components describe in connection with FIGS. 1 and 2.

The x axis of the dataset distribution 500A shows various taxonomy attributes associated with the retrieved datasets. They axis of the dataset distribution 500A is the amount of the datasets having a particular taxonomy attribute. As shown in the dataset distribution 500A, taxonomy attribute C1 has the most datasets among taxonomy attributes C1, C2, C3, and C4, which is indicated by the height of its corresponding bar.

Based on the dataset distribution 500A, one or more taxonomy refinements may be generated and outputted in accordance with some embodiments of the present invention, such as ones described in connection with FIGS. 3 and 4. Referring now to FIG. 6A, an example interface 600A is illustrated. The interface may be shown on a client device, such as one described in connection with client devices 101A-101N of FIG. 1. In some preferred and non-limiting embodiments, the interface 600A may be embodied in a mobile application 601. The interface 600A may include a search input field 603, which enables a user to input a network database search query, such as one described in connection with FIGS. 3 and 4. The interface 600A is further configured to display impressions of retrieved datasets through 607, 609, 611, 613, 615, and 617, as well as taxonomy refinements 605. Each of the retrieved datasets has one of the taxonomy attributes associated with the taxonomy refinements 605, and each taxonomy attribute is associated with at least one retrieved dataset, as shown in FIG. 5A. In some embodiments, the taxonomy refinements 605 may be presented as one or more cards or widgets on the interface 600A.

In some preferred and non-limiting embodiments, when the network database search query is very broad, the interface 600A may only display a limited number of refinements in 605. For example, if the network database search query inputted in 603 is "restaurant," and the retrieved datasets have more than five categories, the interface 600A may only display the top five categories associated with the retrieved datasets in 605.

In some preferred and non-limiting embodiments, when there are more than a first pre-determined amount of categories associated with the retrieved datasets, and each category is associated with more than a second pre-determined amount of datasets, the interface 600A may display a "Featured Taxonomy Refinements" panel on the top of the retrieved dataset list, and each of the "Featured Taxonomy Refinements" is determined based on the combined relevance score associated with the datasets. The "Featured Taxonomy Refinements" panel may further display a message such as "Would you like . . . ." to inform the user that the results can be refined, and the user can navigate to the desired categories via the "Featured Taxonomy Refinements" panel.

For example, in some embodiments, the first pre-determined amount of categories is three, and the a second pre-determined amount of datasets is five. When the retrieved datasets include six categories, and each category has ten datasets (i.e. a total of sixty retrieved dataset), the network server may calculate a combined relevance score for each category, and provide the top three categories in the "Featured Taxonomy Refinements" panel.

When a user selects a particular refinement in 605, the interface 600A is updated to display impressions of retrieved datasets that are only associated with the refinement, as shown in FIG. 6B. For example, when a user selects C3 in 605, only datasets associated with C3 (e.g. 607, 611, and 617) will be displayed, as shown on the interface 600B of FIG. 6B.

Referring now to FIG. 5B, which illustrates an example dataset distribution 500B that has a small amount of retrieved datasets based on the network database search query. As shown in FIG. 5B, only taxonomy C1' has a small amount of datasets, and there is no dataset associated with C2', C3', or C4'. In some preferred and non-limiting embodiments, when the amount of retrieved datasets is less than a third per-determined amount, the interface may suggest other categories associated with the retrieved datasets, as shown in FIG. 6C. In FIG. 6C, suggestions of other categories (e.g. C5' and C6') are shown along with the impressions of datasets 608 and 610 on the interface 600C.

For example, in some embodiments, the third predetermined amount is three. When the network server is unable to identify any dataset related to a search query, a message may be displayed on the interface 600C that states "Our searchers couldn't find any promotion at this moment based on your search term, but you may also like the following." The network server may identify other related taxonomy attributes that are related to the search query, and present datasets associated with these taxonomy attributes on the interface 600C.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for improving network database precision and recall, the computer-implemented method comprising:
   receiving, from a client device, a network database search query associated with one or more network databases;
   in response to receiving the network database search query, querying the one or more network databases to identify a plurality of datasets;
   determining a plurality of taxonomy attributes, each of the plurality of taxonomy attributes being associated with at least one dataset of the plurality of datasets;
   calculating a taxonomy entropy based on the plurality of taxonomy attributes;
   comparing the taxonomy entropy to an entropy threshold;
   in response to the taxonomy entropy satisfying the entropy threshold, generating a dataset ranking based on relevance scores associated with the plurality of datasets;
   dynamically generating one or more taxonomy refinements based on the dataset ranking;

calculating a refinement count for the one or more taxonomy refinements;
determining whether the refinement count satisfies a refinement maximum threshold; and
in response to determining that the refinement count satisfies the refinement maximum threshold:
  aggregating the plurality of taxonomy attributes at a parent taxonomy level;
  generating a taxonomy tree based at least in part on the one or more taxonomy refinements, wherein the taxonomy tree is configured to link the one or more taxonomy refinements to the plurality of datasets; and
  outputting, to the client device, the plurality of datasets and the taxonomy tree to improve the network database precision and recall.

2. The computer-implemented method of claim 1, wherein calculating the taxonomy entropy based on the plurality of taxonomy attributes includes:
  normalizing each of the plurality of taxonomy attributes;
  calculating a dataset taxonomy logarithm for each normalized taxonomy attribute;
  determining a weight value for each of the plurality of taxonomy attributes;
  calculating a weighted taxonomy logarithm by multiplying each dataset taxonomy logarithm by its corresponding weight value; and
  calculating the taxonomy entropy by adding weighted taxonomy logarithms.

3. The computer-implemented method of claim 1, wherein the plurality of taxonomy attributes are associated with a refinement taxonomy, the refinement taxonomy is associated with one or more availability, category, brand, price point, price range, location, distance, duration of time, time of day, day of week, and combinations thereof.

4. The computer-implemented method of claim 3, wherein the determination of the plurality of taxonomy attributes is based on the plurality of datasets.

5. The computer-implemented method of claim 1, further comprising:
  calculating a dataset count based on the plurality of datasets;
  determining whether the dataset count satisfies a dataset minimum threshold; and
  in response to the dataset count not satisfying the dataset minimum threshold, outputting, to the client device, an electronic indication that the one or more taxonomy refinements are selectable for display.

6. The computer-implemented method of claim 1, wherein the one or more taxonomy refinements are presented as one or more cards or one or more widgets.

7. An apparatus for improving network database precision and recall, the apparatus comprising at least one processor and at least one non-transitory memory including program code, the at least one non-transitory memory and the program code configured to, with the at least one processor, cause the apparatus to at least:
  receive, from a client device, a network database search query associated with one or more network databases;
  in response to receiving the network database search query, query the one or more network databases to identify a plurality of datasets;
  determine a plurality of taxonomy attributes, each of the plurality of taxonomy attributes being associated with at least one dataset of the plurality of datasets;
  calculate a taxonomy entropy based on the plurality of taxonomy attributes;
  compare the taxonomy entropy to an entropy threshold;
  in response to the taxonomy entropy satisfying the entropy threshold, generate a dataset ranking based on relevance scores associated with the plurality of datasets;
  dynamically generate one or more taxonomy refinements based on the dataset ranking;
  calculate a refinement count for the one or more taxonomy refinements;
  determine whether the refinement count satisfies a refinement maximum threshold; and
  in response to determining that the refinement count satisfies the refinement maximum threshold:
    aggregate the plurality of taxonomy attributes at a parent taxonomy level;
    generate a taxonomy tree based at least in part on the one or more taxonomy refinements, wherein the taxonomy tree is configured to link the one or more taxonomy refinements to the plurality of datasets; and
    output, to the client device, the plurality of datasets and the taxonomy tree to improve the network database precision and recall.

8. The apparatus of claim 7, wherein calculating the taxonomy entropy based on the plurality of taxonomy attributes includes:
  normalizing each of the plurality of taxonomy attributes;
  calculating a dataset taxonomy logarithm for each normalized taxonomy attribute;
  determining a weight value for each of the plurality of taxonomy attributes;
  calculating a weighted taxonomy logarithm by multiplying each dataset taxonomy logarithm by its corresponding weight value; and
  calculating the taxonomy entropy by adding weighted taxonomy logarithms.

9. The apparatus of claim 7, wherein the plurality of taxonomy attributes are associated with a refinement taxonomy, the refinement taxonomy being selected from a group consisting of availability, category, brand, price point, price range, location, distance, duration of time, time of day, day of week, and combinations thereof.

10. The apparatus of claim 9, wherein the determination of the plurality of taxonomy attributes is based on the plurality of datasets.

11. The apparatus of claim 7, wherein the at least one non-transitory memory and the program code are further configured to, with the at least one processor, cause the apparatus to:
  calculate a dataset count based on the plurality of datasets;
  determine whether the dataset count satisfies a dataset minimum threshold; and
  in response to the dataset count not satisfying the dataset minimum threshold, output, to the client device, an electronic indication that the one or more taxonomy refinements are selectable for display.

12. The apparatus of claim 7, wherein the one or more taxonomy refinements are presented as one or more cards or one or more widgets.

13. A computer program product for improving network database precision and recall, the computer program product comprising at least one non-transitory computer-readable storage medium having computer-readable program code portions stored therein, the computer-readable program code portions comprising an executable portion configured to:
  receive, from a client device, a network database search query associated with one or more network databases;

in response to receiving the network database search query, query the one or more network databases to identify a plurality of datasets;

determine a plurality of taxonomy attributes, each of the plurality of taxonomy attributes being associated with at least one dataset of the plurality of datasets;

calculate a taxonomy entropy based on the plurality of taxonomy attributes;

compare the taxonomy entropy to an entropy threshold;

in response to the taxonomy entropy satisfying the entropy threshold, generate a dataset ranking based on relevance scores associated with the plurality of datasets;

dynamically generate one or more taxonomy refinements based on the dataset ranking;

calculate a refinement count for the one or more taxonomy refinements;

determine whether the refinement count satisfies a refinement maximum threshold; and in response to determining that the refinement count satisfies the refinement maximum threshold:
- aggregate the plurality of taxonomy attributes at a parent taxonomy level;
- generate a taxonomy tree based at least in part on the one or more taxonomy refinements, wherein the taxonomy tree is configured to link the one or more taxonomy refinements to the plurality of datasets; and
- output, to the client device, the plurality of datasets and the taxonomy tree to improve the network database precision and recall.

14. The computer program product of claim 13, wherein calculating the taxonomy entropy based on the plurality of taxonomy attributes includes:
- normalizing each of the plurality of taxonomy attributes;
- calculating a dataset taxonomy logarithm for each normalized taxonomy attribute;
- determining a weight value for each of the plurality of taxonomy attributes;
- calculating a weighted taxonomy logarithm by multiplying each dataset taxonomy logarithm by its corresponding weight value; and
- calculating the taxonomy entropy by adding weighted taxonomy logarithms.

15. The computer program product of claim 13, wherein the determination of the plurality of taxonomy attributes is based on the plurality of datasets.

16. The computer program product of claim 13, wherein the computer-readable program code portions comprising the executable portion further configured to:
- calculate a dataset count based on the plurality of datasets;
- determine whether the dataset count satisfies a dataset minimum threshold; and
- in response to the dataset count not satisfying the dataset minimum threshold, output, to the client device, an electronic indication that the one or more taxonomy refinements are selectable for display.

* * * * *